US005316121A

United States Patent [19]

Zaharia et al.

[11] Patent Number: 5,316,121

[45] Date of Patent: May 31, 1994

[54] ESCALATOR MISSING STEP DETECTION

[75] Inventors: Vlad Zaharia, Rocky Hill; Gerald E. Johnson, Farmington, both of Conn.

[73] Assignee: Otis Elevator Company, Farmington, Conn.

[21] Appl. No.: 981,699

[22] Filed: Nov. 25, 1992

[51] Int. Cl.[5] ........ B65G 43/00

[52] U.S. Cl. ........ 198/323

[58] Field of Search ........ 198/323

[56] References Cited

U.S. PATENT DOCUMENTS

| | | | |
|---|---|---|---|
| 3,580,376 | 5/1971 | Loshbough | 198/323 |
| 4,863,006 | 9/1989 | Kotkata et al. | 198/323 |
| 5,096,040 | 3/1992 | Wente et al. | 198/323 |
| 5,107,975 | 4/1992 | Iwata | 198/323 |

FOREIGN PATENT DOCUMENTS

| | | | |
|---|---|---|---|
| 0082074 | 6/1983 | European Pat. Off. . | |
| 0307557 | 6/1988 | European Pat. Off. . | |
| 53-140788 | 8/1978 | Japan . | |
| 0159988 | 12/1979 | Japan | 198/323 |
| 0850541 | 7/1981 | U.S.S.R. . | |
| 1500609 | 8/1989 | U.S.S.R. | 198/323 |

*Primary Examiner*—James R. Bidwell
*Attorney, Agent, or Firm*—Breffni X. Baggot

[57] ABSTRACT

An induction proximity sensor 26 is wider than a normal gap between moving escalator steps 10, 12 so that the inductive proximity sensor 26 is always in front of one step or another and provides a constant signal, when steps 10, 12 are passing the inductive proximity sensor 26, and stops the steps 18, 12, 14, 16 when the inductive proximity sensor 26 detects no steps.

8 Claims, 2 Drawing Sheets

ESCALATOR MISSING STEP DETECTION

TECHNICAL FIELD

This invention relates to detection of a missing step of an escalator.

BACKGROUND OF THE INVENTION

People conveyors such as escalators or moving walkways which are formed from adjacent moving steps include a passenger carrying path of travel, which begins and ends at opposed landings, and a return path of travel disposed beneath the passenger carrying path of travel and out of sight of passengers. The sprockets engage and guide step chains through a 180° arc to reverse the direction of step movement. As the steps pass over the sprockets, the steps invert and re-invert their spatial orientation.

With extensive usage and equipment aging, the possibility arises that a step may break loose from the step chain. If a step thus should break loose, it will swing by gravity away from its normal path of travel and the step tread will fall downwardly. When the steps are properly connected together on the step chain, there will be a constant procession of steps past any given point along the path of travel, and there will not exist any significant gaps in the step procession. When a step breaks loose, a significant gap will be created in the procession of steps. Further, the conveyor drive may continue to operate so that a person using the conveyor would not know that a step is missing or out of place. This could result in injury to passengers when the displaced step returns to the passenger-carrying path of travel.

The problem of detecting abnormally positioned passenger conveyor steps has been addressed in the prior art. One prior art system discloses a monitor for an escalator for detecting the presence or absence of the escalator step rollers to detect detached escalator steps, should one occur. This mechanical arrangement is expensive. A second prior art system shows an inductive proximity sensor at a step and if the inductive proximity sensor detects no step for a time greater than a time limit stored in a timer, then a missing step signal is provided and the escalator stopped. A disadvantage of this system is the cost of the timer. A second disadvantage is that for a fully loaded escalator or an older escalator with deteriorated performance, the escalator moves more slowly than otherwise and the detection of the normal gap between steps may be mistaken for a missing step. Third, the timer requires fine calibration so that the time intervals stored in the timer correspond exactly with the time for a step and the gap between two steps to pass the inductive proximity sensor. Or, if for some reason the escalator is moving excessively fast, a step may be missing but go undetected, resulting in harm to any passenger stepping into the consequent void. A third prior art system discloses an escalator step which uses photoelectric detectors below the steps to detect the dropping of a step. This system also requires a timer.

A fourth system discloses a mechanical sensor placed beside the return run of the steps on an escalator or moving walk. The sensor is biased toward the step so as to bear against each step passing thereby. If a step in the series is missing from its normal position, the sensor moves in the direction of the step run and opens a switch, thereby shutting off power to the escalator.

In sum, all of the above schemes detect a missing step by sensing a single step and using a timer, or by being actuated by a single step.

DISCLOSURE OF THE INVENTION

It is an object of the present invention to detect a missing step of an escalator.

According to the present invention, a proximity sensor is wider than a normal gap between moving escalator steps and provides a missing step signal when the inductive proximity sensor detects no steps for causing the braking of the steps on the escalator.

The advantage of the present invention is that no timer is needed.

BEST MODE FOR CARRYING OUT THE PRESENT INVENTION

Figure 1:
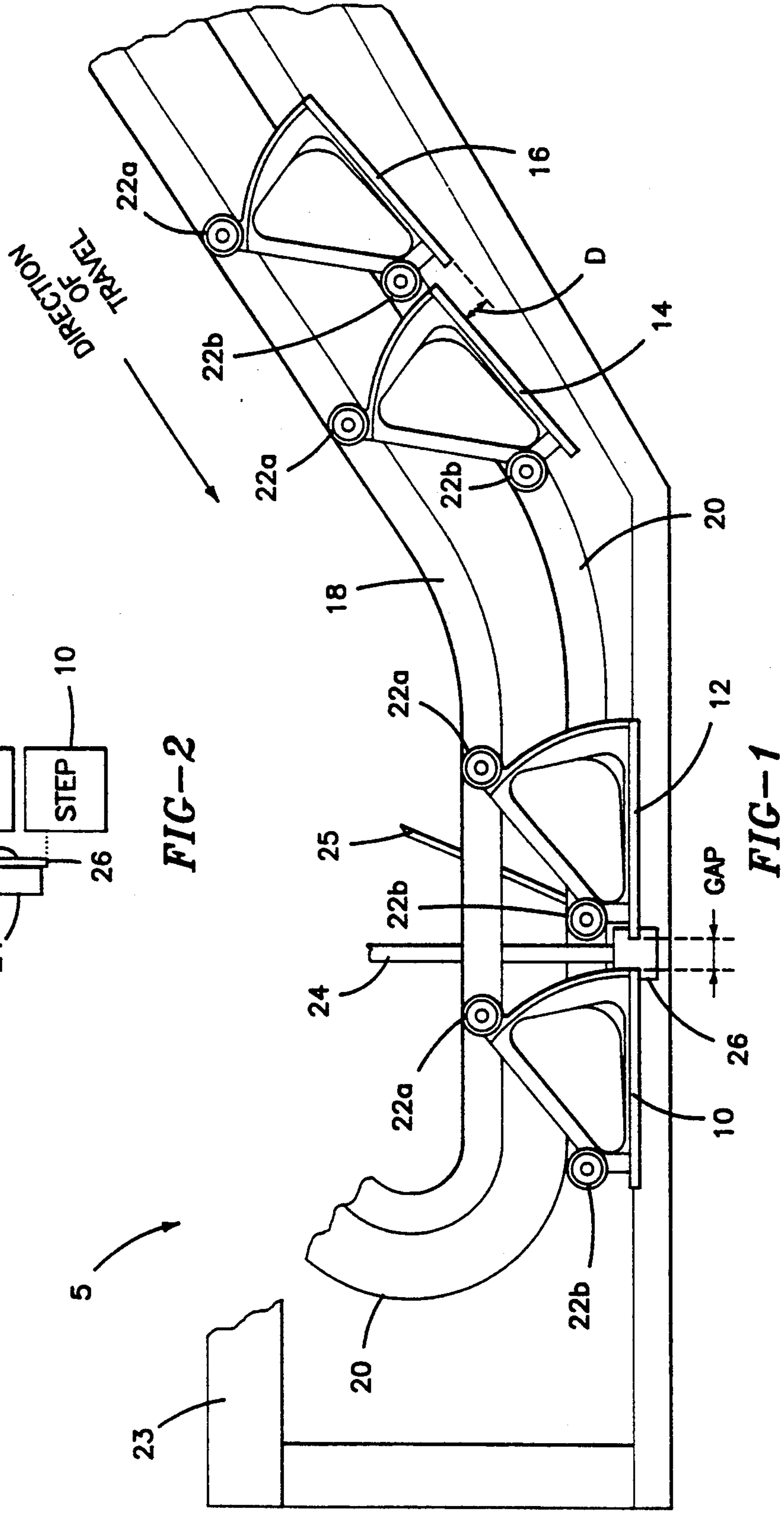
FIG. 1 is a side view of escalator steps on a return path.

FIG. 1 shows escalator steps 10, 12, 14, 16 for moving downwardly at the bottom of a return path of an escalator. The escalator steps 10, 12, 14, 16 ride on steel tracks 18, by means of step rollers *22a* and chain rollers *22b*. The steel tracks 18, 20 are contained within a truss 23 which includes a vertical member 24 and an angled member 25 attached thereto. While the steps 14, 16 are descending, their step faces are not lined up and are separated by a distance "D". But steps 10, 12 have reached the bottom of the return path and are at the same level. As the steps 10, 12 pass an inductive proximity sensor 26 mounted on the vertical member, their presence is detected. Because the inductive proximity sensor 26 is wider than the gap between the steps, the inductive proximity sensor 26 constantly detects steps 10, 12. If, however, a step is misaligned or missing, that aberration will be detected by the inductive proximity sensor 26. The inductive proximity sensor 26 is located at the bottom of the turn path where the steps 10, 12 are at a constant level in order that the smallest possible inductive proximity sensor may be used. A larger inductive proximity sensor would be needed to detect a missing or misaligned step in the region of the steel tracks where the steps 14, 16 are located and the gap between the steps 10, 12 is wider.

Figure 2:
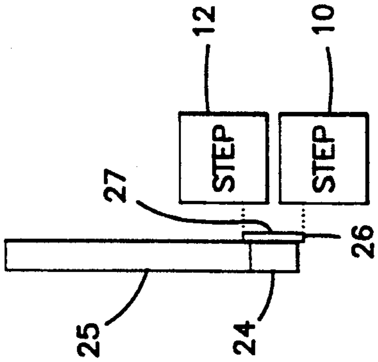
FIG. 2 is a top view of escalator steps.

FIG. 2 shows the top view of the vertical member 24, angle member 25, and inductive proximity sensor 26. FIG. 2 demonstrates that the face of the inductive proximity sensor 26 is larger than the gap between the steps 10, 12 such that if the inductive proximity sensor 26 senses no step, it is likely because of a missing or misaligned step. A normal gap between steps 10, 12 is typically 2 mm and the inductive proximity sensor face would in that case be 10 mm.

Figure 3:
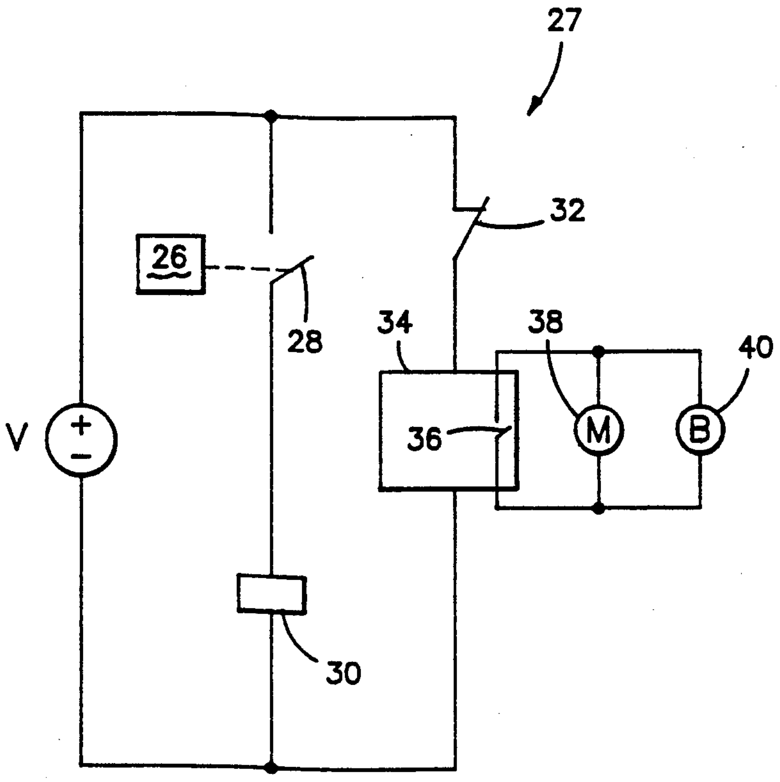
FIG. 3 is a circuit diagram illustrating the present invention.

FIG. 3 shows a circuit 27 responsive to an output signal from the inductive proximity sensor 26 for indicating a missing or misaligned step. A potential difference V is applied across a switch 28 and a relay 30. The switch 28 is responsive to the output signal of the inductive proximity sensor 26 and is closed so long as the inductive proximity sensor 26 senses a step 10, 12. When the inductive proximity sensor 26 senses no metal of a step 10, 12, the output signal of the inductive proximity sensor 26 causes the relay 30 to de-energize, causing a contact 32 associated with the relay 30 to close and a circuit breaker 34 to open an auxiliary contact 36, which causes an escalator motor 38 to lose power and escalator brake 40 to stop movement of the escalator 17 including steps 10, 12, 14, 16.

Figure 4:
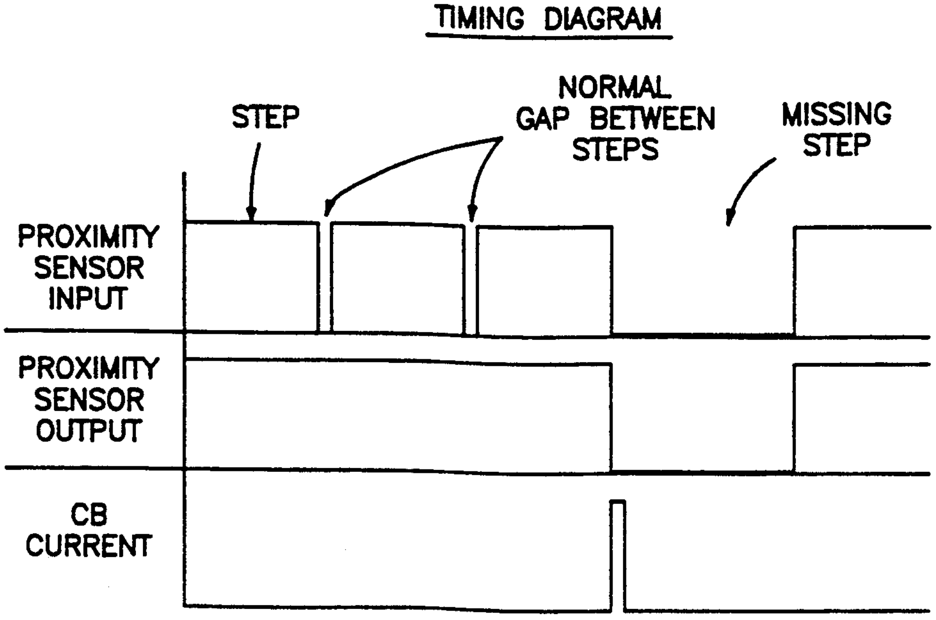
FIG. 4 is a timing diagram for the circuit of FIG. 3.

FIG. 4 shows the input of the inductive proximity sensor 26, the output of the inductive proximity sensor 26, and the current through the circuit breaker 34. The output to the inductive proximity sensor 26 is in a first state, high, when a step is in front of an inductive proximity sensor 26 and in a second state, low, otherwise. Because the inductive proximity sensor 26 is wider than the gap, the output of the inductive proximity sensor 26 is high until a step is missing, at which point the relay 30 de-energizes, and the circuit breaker current peaks and then falls, thereby open-circuiting the escalator motor 38 and escalator brake 40 to slow the steps to a halt.

Various changes in the above description may be made without effect on the invention. For example, the inductive proximity sensor 26 could be many other types of sensors, such as an optical sensor. Further, the sensor—inductive proximity or otherwise—does not need to be placed at the bottom of the escalator truss where the faces of the steps 10. 12 line up; it could be placed at any point on the truss so long as the sensor face exceeds the normal gap between moving steps.

We claim:

1. An apparatus for detecting a missing or misaligned step of an escalator, comprising:

sensing means, responsive to the presence of one or more moving escalator steps, for providing a signal in a first state when a gap between the moving escalator steps is a first width and in a second state when the gap between moving escalator steps is a second width greater than said first width.

2. The apparatus of claim 1, wherein said sensing means has a sensing range sufficient to detect two adjacent steps at the same time.

3. The apparatus of claim 1, wherein said sensing means is an inductive proximity sensor having a sensor face greater than said first width.

4. The apparatus of claim 1, wherein said signal in said first state is provided when the gap between moving escalator steps does not exceed a normal width and said signal in said second state is provided when the gap between moving escalator steps exceeds a normal width.

5. The apparatus of claim 1, further including means for slowing the steps on said escalator in response to said signal in said second state.

6. A method for detecting a missing or misaligned step of an escalator, comprising:

sensing the presence of one or more moving escalator steps and providing a signal in a first state when a gap between said steps is a first width and in a second state when the gap width between said moving escalator steps is a second width greater than said first width;

slowing said moving escalator steps in response to said signal in said second state.

7. The method of claim 6, wherein sensing includes sensing more than one step at the same time.

8. The method of claim 6, wherein said signal is in said first state provided when the gap between moving escalator steps does not exceed a normal width and said signal in said second state is provided when the gap between moving escalator steps exceeds the normal width.

* * * * *